(12) United States Patent
Böhm

(10) Patent No.: US 7,677,352 B2
(45) Date of Patent: Mar. 16, 2010

(54) METHOD FOR STEERING A VEHICLE BY MEANS OF A SUPERIMPOSED STEERING SYSTEM

(75) Inventor: Jürgen Böhm, Oberneisen (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 780 days.

(21) Appl. No.: 10/566,420

(22) PCT Filed: Jul. 21, 2004

(86) PCT No.: PCT/EP2004/051564
§ 371 (c)(1),
(2), (4) Date: Sep. 25, 2006

(87) PCT Pub. No.: WO2005/012061
PCT Pub. Date: Feb. 10, 2005

(65) Prior Publication Data
US 2007/0162205 A1 Jul. 12, 2007

(30) Foreign Application Priority Data
Jul. 28, 2003 (DE) ............... 103 34 234
Jun. 30, 2004 (DE) ............... 10 2004 031 653

(51) Int. Cl.
B62D 6/00 (2006.01)
(52) U.S. Cl. ........................ 180/444; 701/41
(58) Field of Classification Search ................ 180/444, 180/446; 701/41
See application file for complete search history.

(56) References Cited

U.S. PATENT DOCUMENTS

| 6,427,104 | B1 * | 7/2002 | Matsushita et al. ............ 701/41 |
| 7,063,636 | B2 * | 6/2006 | Augustine ...................... 475/3 |
| 2003/0221900 | A1 * | 12/2003 | Bolourchi et al. ........... 180/446 |
| 2004/0251061 | A1 * | 12/2004 | Augustine .................. 180/6.2 |

FOREIGN PATENT DOCUMENTS

| DE | 19601825 | 7/1997 | |
| DE | 15751125 | 9/1998 | |
| DE | 10124436 | 11/2002 | |
| DE | 10143029 | 11/2002 | |
| DE | 10220123 | 12/2002 | |
| DE | 10142366 | 3/2003 | |
| DE | 10160716 | 6/2003 | |
| DE | 10160716 A1 * | 6/2003 | ................. 180/444 |
| DE | 10328752 | 2/2004 | |
| EP | 0778660 | 6/1997 | |
| EP | 0918012 | 5/1999 | |
| EP | 1236638 | 9/2002 | |
| WO | 2004005111 | 1/2004 | |

* cited by examiner

Primary Examiner—Tony H. Winner

(57) ABSTRACT

A process for steering a motor vehicle having a superimposition steering system, in which a steering angle input by the driver and an additional angle (supplemental angle) are detected, and in which the steering angle input can be superimposed with the supplemental steering angle in accordance with additional values, particularly driving dynamic values, by a superimposition actuator, such as an electrical motor, and can be superimposed by a superimposition gear in order to adjust a resulting steering angle. A value for a gear input angle of the superimposition gear is determined in accordance with the resulting steering angle of the steering system and in accordance with a value that is directly dependent on the supplemental steering angle or describes the supplemental steering angle.

10 Claims, 7 Drawing Sheets

Figure 1:
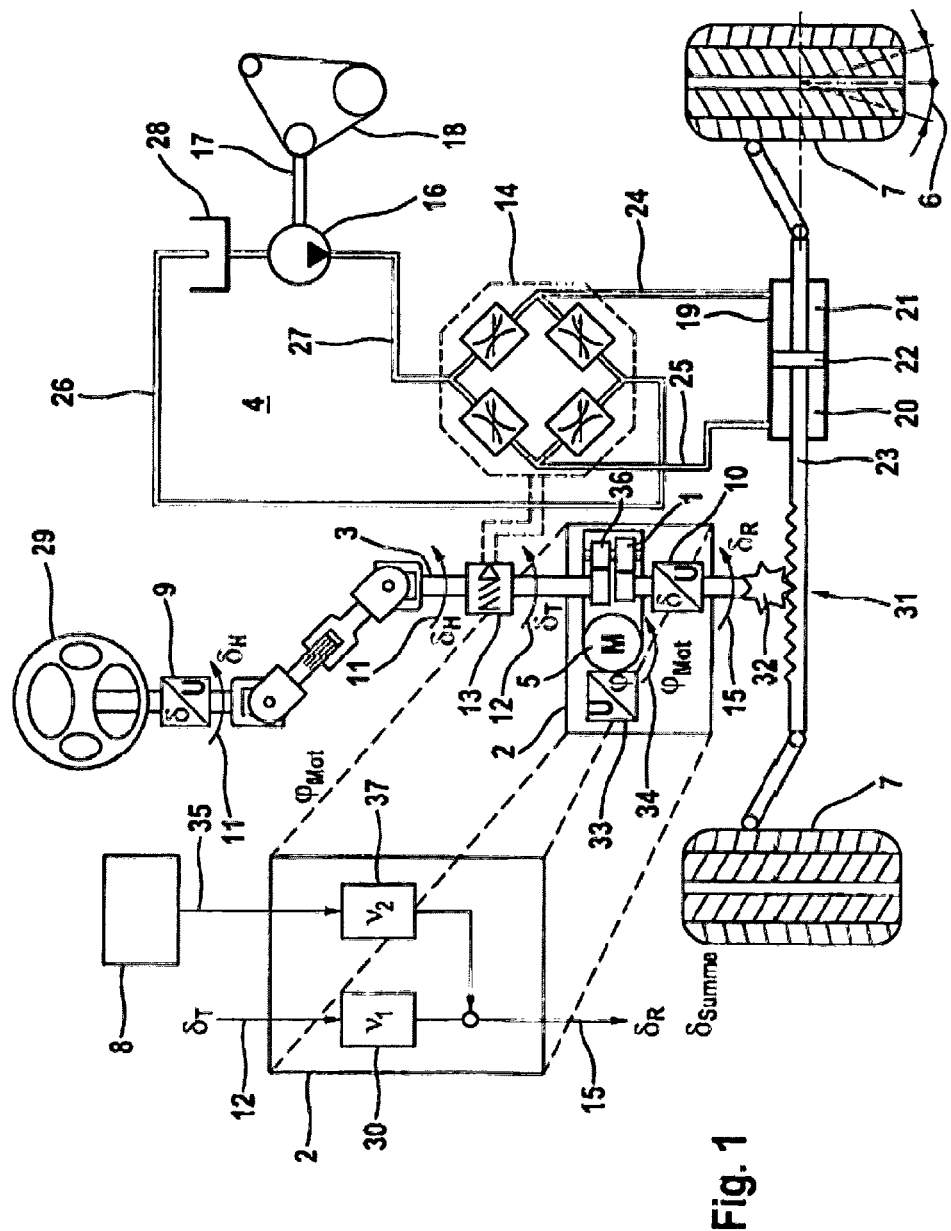

(47) Fahrdynamikgrößen = Driving dynamics values.
(38) Fahrdynamikregler = Driving dynamics control device.
$\delta_{Summe}$ = $\delta_{Total}$
(8) ESAS - Lenkungsregler = ESAS Steering control device.

ERSATZBLATT (REGEL 26)

| (38) | Fahrdynamikregler | = | Driving dynamics control device. |
| (50) | Lenkungsregelkreis | = | Steering control circuit. |
| | $\delta_{Summe}$ | = | $\delta_{Total}$ |

Variable Lenkübersetzung = Variable steering transmission

(63) Lenkwinkelregler           (63) Steering angle control unit
(76) Drehzahlregler             (76) Rotational speed control unit
(74) Drehzahlberechnung         (74) Rotational speed computation
     Lenkwinkelregelung              Steering angle control

METHOD FOR STEERING A VEHICLE BY MEANS OF A SUPERIMPOSED STEERING SYSTEM

The invention relates to a process for steering a motor vehicle with a superimposition steering system, in which a steering angle input by the driver and an additional angle (supplemental angle) are detected, and in which the steering angle input can be superimposed with the supplemental steering angle in accordance with additional values, particularly driving dynamic values, by means of an electrical motor.

The invention also relates to a computer program and a steering system for a motor vehicle with a steering wheel positioned on a steering column, with a steering gear, a rotational angle sensor positioned on the steering column, a superimposition motor acting on the steering column by means of a superimposition gear, an electrical steering regulator, a sensor for measuring the position of the steered wheels, as well as with a steering control device.

Current motor vehicles, particularly passenger vehicles, are generally equipped with hydraulic or electrohydraulic power-assisted steering devices, in which a steering wheel is mechanically force-locked with the steerable vehicle wheels. The power-assisted steering support is constructed in such a manner that actuators, such as hydraulic cylinders, for example, are positioned in the central area of the steering mechanism. The activation of the steering mechanism in reaction to the rotation of the steering wheel is supported by means of a force produced by the actuators. The energy expenditure of the driver during the steering process is thereby reduced.

Superimposition steering systems are known. They are characterized in that, in the event of need, an additional steering angle (supplemental steering angle) can be superimposed on the steering angle set by the driver by means of an actuator. Electrical actuators, which act on a superimposition gear and adjust the supplemental steering angle in a manner thoroughly independent of the driver, are normally used.

The additional steering angle is controlled by an electronic control device and serves to increase the stability and maneuverability of the vehicle, for example. In accordance with one known control concept, such as described in the German patent document DE 197 51 125 A1, the steering portions of the superimposed steering angle are formed independently of one another.

The task that forms the basis of the invention is that of providing a process for steering a motor vehicle by means of a superimposition steering system that operates securely and reliably.

This task is solved in accordance with the invention through the fact that a value for a gear input angle $\hat{\delta}_T$ of the superimposition gear is determined in accordance with the resulting steering angle of the steering system and in accordance with a value that is directly dependent on the supplemental steering angle or describes the supplemental steering angle.

In accordance with the invention, it is provided that a driver's choice $\delta_{CMD, DRV}$ of a steering movement is, for the regulation of the steering angle, formed by multiplying the value for the gear input angle $\hat{\delta}_T$ (53) by an amplification factor $v_{\delta, ESAS}$ resulting from a variable steering transmission.

In accordance with the invention, the resulting steering angle of the steering system is a pinion gear angle of a toothed rack steering unit $\delta_R = \delta_{Total}$.

One advantageous configuration of the process in accordance with the invention consists of the fact that the value which is directly dependent on the supplemental steering angle or which describes the supplemental steering angle characterizes the location or the position of a superimposition actuator.

In accordance with the invention, it is provided that the value that characterizes the location or the position of a superimposition actuator is the angle of an electronic superimposition motor (motor angle $\phi_{Mot}$).

In accordance with an additional configuration of the invention, it is provided that the process has a steering angle regulation system with subordinated current- or motor torque regulation of an electrical motor as a superimposition actuator, whereby a theoretical current or a theoretical motor torque is produced in dependence on a comparison between an actual steering angle value and a theoretical steering angle value, by means of which the electrical motor feeds the supplemental steering angle into the steering system.

In accordance with the invention, it is provided that the steering choice of the driver is formed in accordance with a fixed or variably set gear transmission factor, and the drive transmission factor is selected in a manner corresponding to the current driving situation, particularly the detected forward speed of the vehicle and/or a steering wheel locking angle, and that a superimposed steering angle is determined and conveyed to the steering control system as an actual value.

In accordance with the invention, it is provided that the choice of the driver is, in connection with a superimposition factor by means of which the driver's steering angle acts directly on a steering gear, superimposed in an additive manner with a supplemental steering angle in connection with a second transmission, and that a superimposed steering angle is determined and is conveyed to the steering control system as an actual value.

One advantageous configuration of the process in accordance with the invention consists of the fact that a driving dynamics regulating system (ESP system) cooperates with the steering control system, and that, if the need for a stabilizing engagement is detected by the driving dynamics control system, then an additional steering angle, which is dependent on the driving dynamics, is determined and is superimposed on the driver's steering choice in an additive manner.

In accordance with one additional configuration of the invention, it is provided that, in order to increase the rotational speed of the motor without reducing the available motor torque, the electrical motor is, in accordance with addition values, additionally triggered by means of a weak field current The electrical motor is preferably triggered by means of a weak field current if a very direct steering transmission and/or a high theoretical speed is desired or necessary.

In accordance with an additional configuration of the invention, it is provided that an anticipatory control of the theoretical speed of the electrical motor is carried out, and that the anticipatory control value is weighted in dependence on a desired motor speed of the electrical motor.

In accordance with the invention, it is provided that an anticipatory control of a theoretical speed of the electrical motor is carried out, which is determined from a motor rotational speed default and a motor rotational speed theoretical default, whereby the theoretical motor rotational speed default is determined on the basis of a comparison of a theoretical steering angle value with an actual steering angle value that has been determined, and the motor rotational speed default is determined from the temporal differentiation of the theoretical steering angle value in accordance with signal portions that result from the steering choice of the driver and on the basis of the ESP correction angle requested.

It is likewise provided in accordance with the invention that an anticipatory control of a theoretical speed of the electrical motor is carried out and the signal portions that result from the steering choice of the driver and from the ESP correction angle requested are weighted separately from one another in regard to dynamics and comfort.

In accordance with the invention, the task is solved by means of a computer program that is suitable for carrying out a process in accordance with the preceding claims.

The task is also solved by means of a steering system for a motor vehicle with a steering wheel positioned on a steering column, with a steering gear, a rotational angle sensor positioned on the steering column, a superimposition motor acting on the steering column by way of a superimposition gear, a sensor for measuring the position of the wheels steered, and with a steering control device, in which steering system/steering control device has means for carrying out the process in accordance with the invention described above.

Examples of implementation of the process in accordance with the invention are depicted in the diagrams (FIG. 1 and FIG. 7) and are described in the following.

Figure 2:
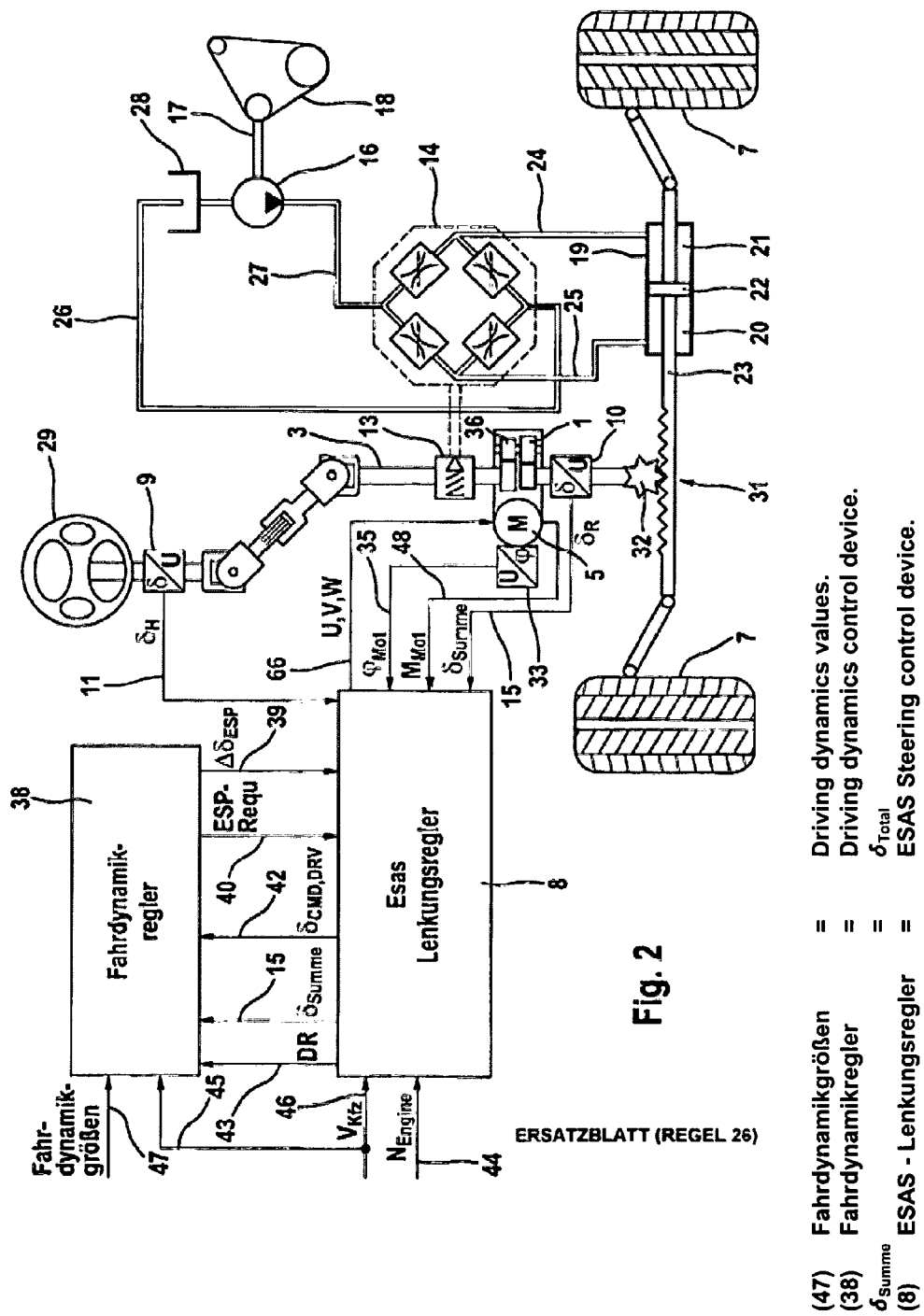
Figure 3:
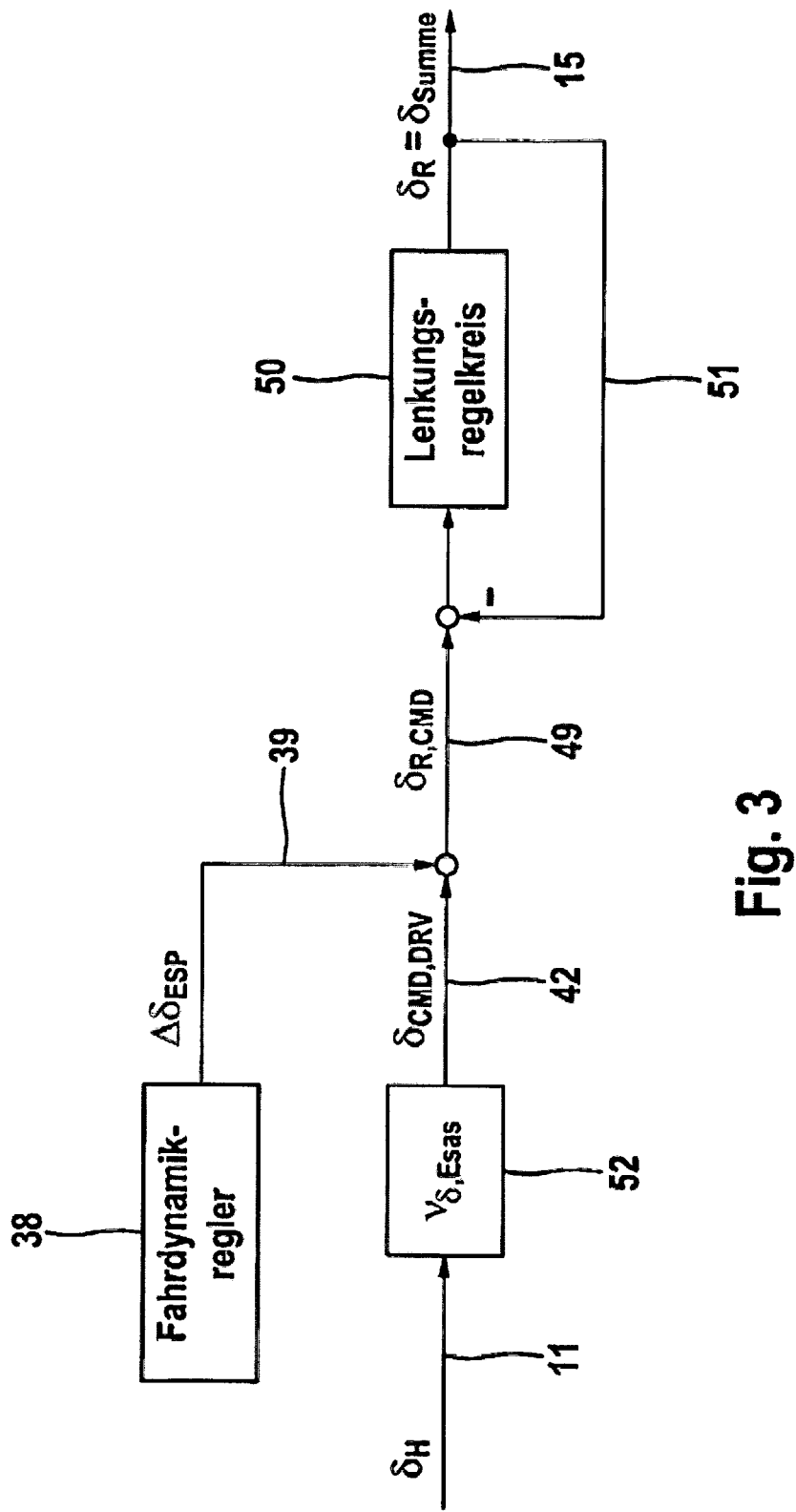
Figure 4:
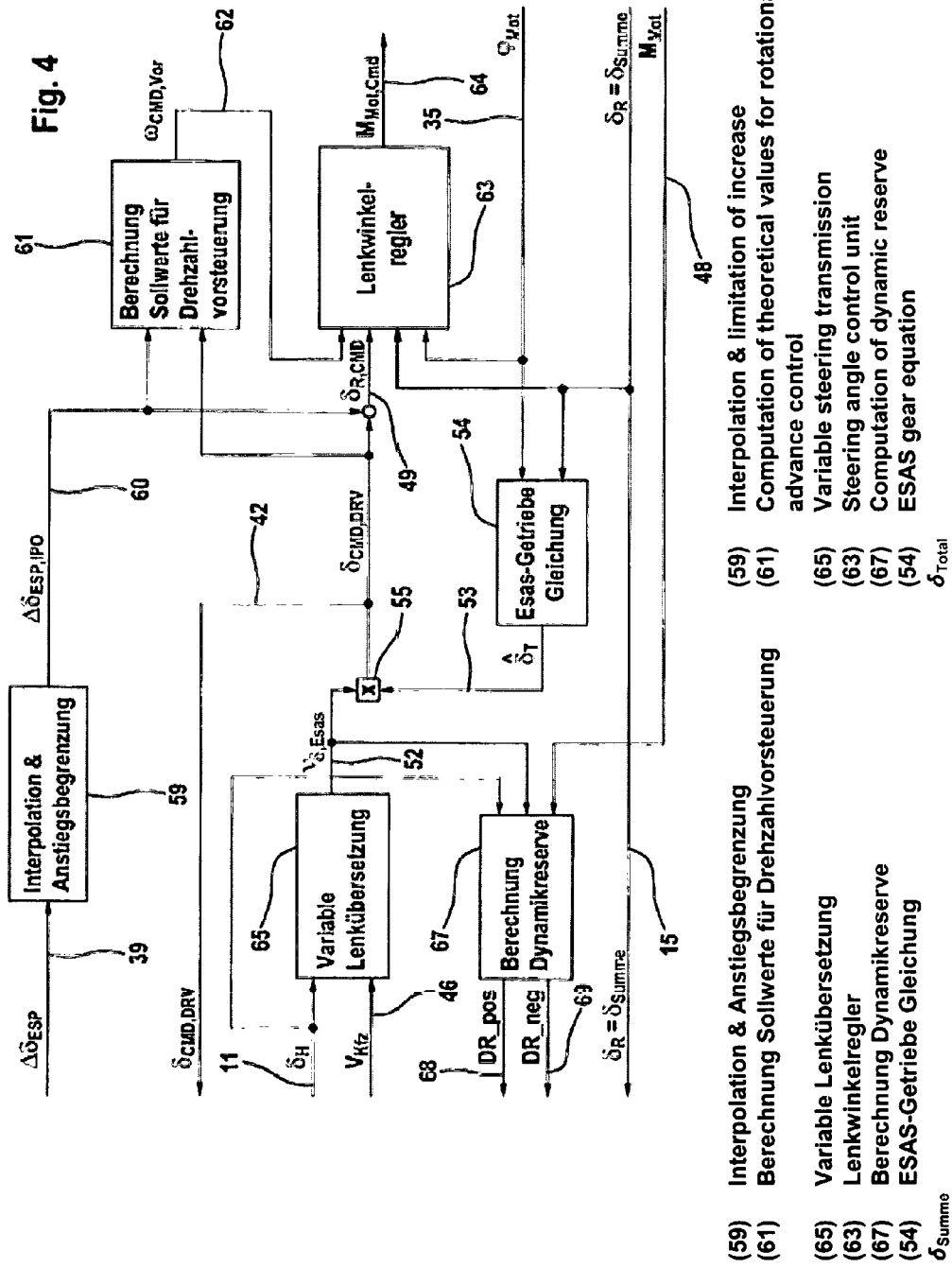
Figure 5:
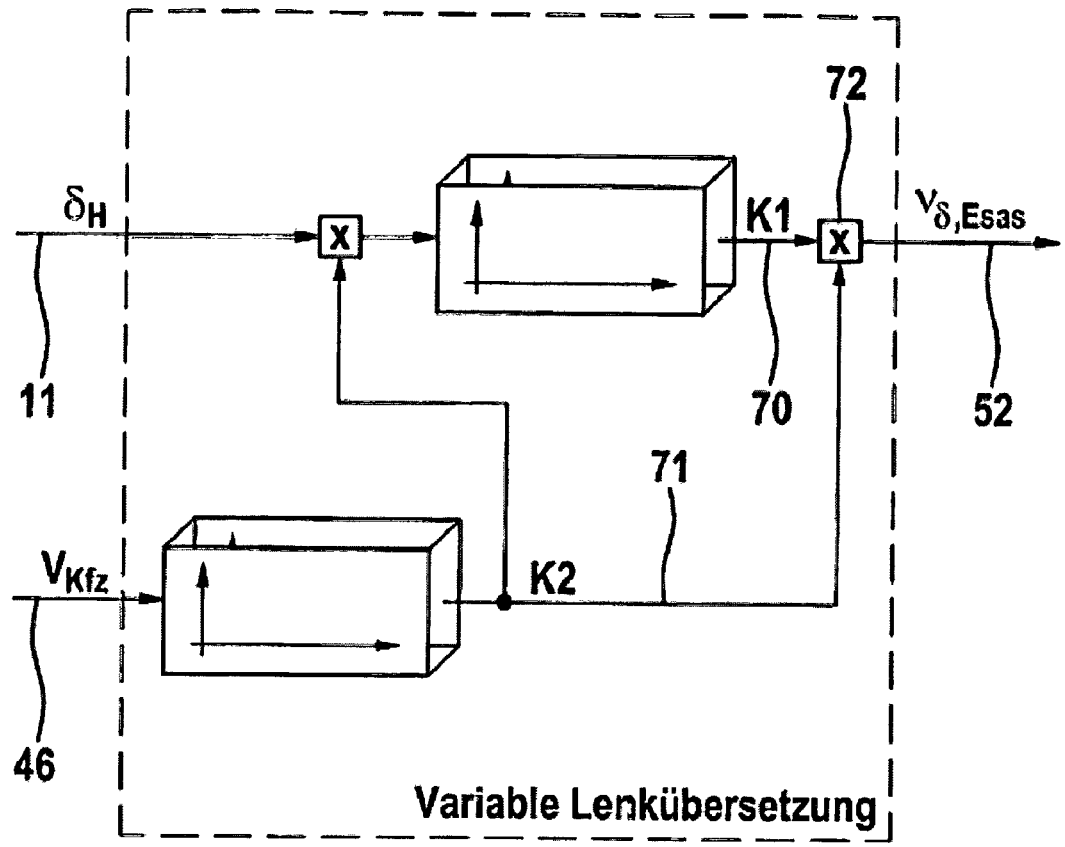
Figure 6:
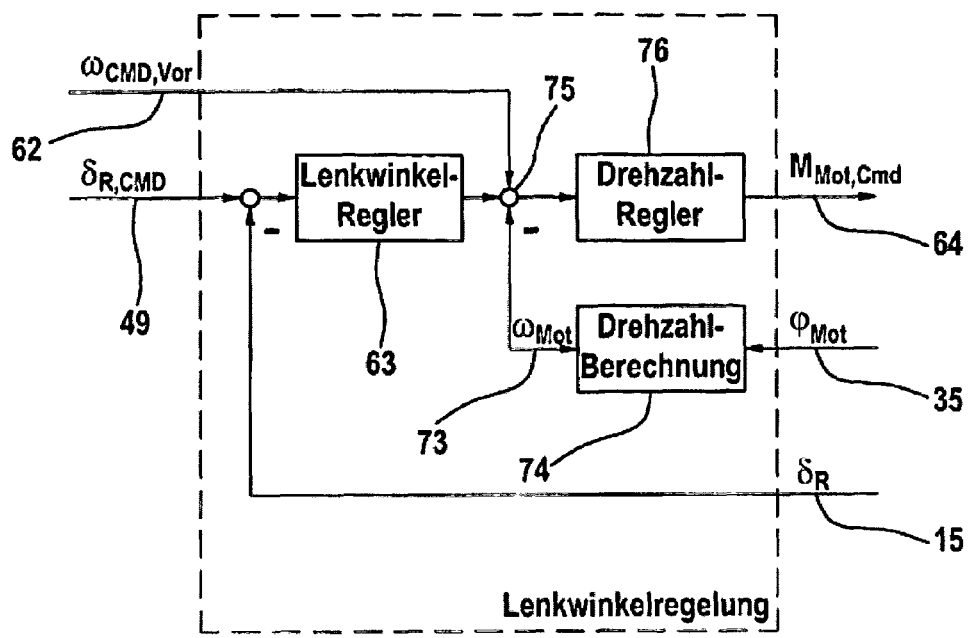
Figure 7:
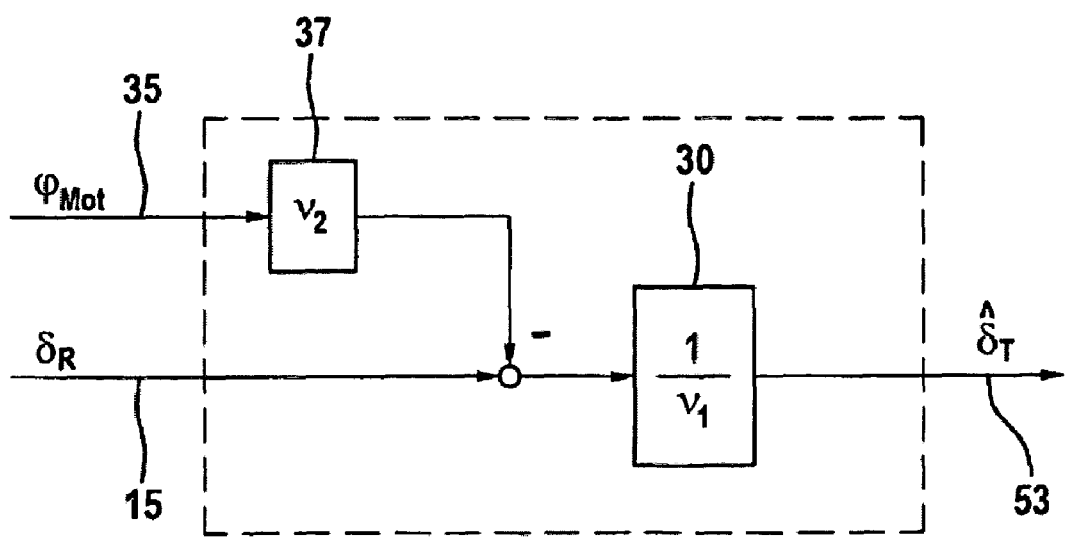

These depict the following:

FIG. 1: A schematic representation of a superimposition steering system with a control system in accordance with the invention;

FIG. 2: A schematic block diagram of the overall control concept of the superimposition steering system;

FIG. 3: A schematic block diagram of the control concept for the engagement of a driving dynamics control device;

FIG. 4: A schematic block diagram of the steering angle control system as an overall overview concept;

FIG. 5: A schematic block diagram for the determination of an amplification factor;

FIG. 6: A schematic block diagram of the steering control system in individual terms; and:

FIG. 7: A schematic block diagram for the determination of a gear input signal.

The basic structure of a superimposition steering system (ESAS/Electric Steer Assisted Steering) with a steering system in accordance with the invention is schematically depicted in FIG. 1, in which a superimposition gear driven by means of an electrical motor is positioned between the rotational bar of a steering valve (torsion bar) and the steering gear or pinion gear of a toothed rack steering system, as the case may be.

A superimposition gear (1) of a superimposition steering system (2) is hereby built into the divided steering column (3) of a conventional power-assisted steering unit (4). By means of a motor (5), an additional or a reduced steering angle (6) can be produced on the front wheels (7) by means of the superimposition gear (1) (variable steering transmission).

The steering angle resulting from the variable steering transmission is adjusted by a control device (8) which controls the electrical motor (5). Signals from rotational angle sensors (9, 10), by means of which the rotational angle $\delta_H$ (11) of the steering column (3) in front of the rotational bar (13) (torsion bar) of the steering valve (14) and the rotational angle behind the superimposition gear (1), in this case, the rotational angle $\delta_R$ (15) of the pinion gear (32) of the steering gear (31), are determined, are conveyed to the control device (8).

The steering wheel angle $\delta_H$ (11) set by the driver by means of a manual steering knob (29) is thereby preferably determined by means of a steering wheel sensor (9) installed in serial form in motor vehicles with a driving dynamics control system (ESP-Systems). Depending on the rigidity of the rotational bar (13) (torsion bar) of the steering valve (14)and a steering torque applied by the driver, a differential angle between the steering wheel angle $\delta_H$ (11) and an input angle $\delta_T$ (12) of the superimposition gear (1) is present.

In addition to the rotational angle of the pinion gear (32) of the steering gear (31), the "pinion gear angle" $\delta_R$ (15), the motor angle $\delta_{Mot}$ (34) of the motor (5) is also determined by means of a third sensor (33). The requirements in regard to precision and resolution for the sensors (10, 33) in the determination of the rotational angle $\delta_R$ of the pinion gear (33) and of the motor angle $\delta_{Mot}$ (34) are higher than in the steering wheel angle sensor (9).

The hydraulic pressure for the conventional power-assisted steering unit (4) is produced by a pump (16) which is, in the present case, connected with the drive motor (18) of a motor vehicle by way of a drive (17). It is advantageously provided in an alternative manner that the pump (16) is driven in a manner corresponding to the requirements by means of an electronically controlled motor (E-motor).

A support for the force of the driver is brought about by means of a hydraulic cylinder (19), which has two chambers (20, 21) that are separated by a hydraulic piston (22), which is connected with a toothed rack (23) of the steering system. For a transport into and out of the hydraulic chambers (20, 21) for the purpose of the regulation of pressure, hydraulic lines (24, 25, 26, 27) and a pressure medium storage container (28) are provided.

In the superimposition function of the steering system, an additional steering angle (motor angle $\phi_{Mot}$) (35), which acts on the steering gear (31) by way of a gear (36) with a second transmission factor v2 (37), is superimposed on the driver's steering angle $\delta_H$ (11) which acts, by way of the rotational bar (13) and the gear (1) with the transmission factor of v1, directly on the steering gear (31) in a manner corresponding to the basic steering function desired (in essential terms, the steering transmission) of the steering control device (8). A specific rotational angle of the pinion gear (32) of the steering gear (31)—that is to say, the "pinion gear angle" $\delta_R$ (15)—results from the superimposition as the total angle.

FIG. 2 depicts the overall control concept of the steering angle control system for the superimposition steering under consideration here, as well as the communication of the steering control device (8) with a superordinate driving dynamics control system (38), in a summary overview.

In addition to a desired supplemental steering angle $\Delta\delta_{ESP}$ (39) of the driving dynamics control system (ESP) (38), an ESP request (ESP-Request-Bit, ESP-Requ) (40), which indicates that a driving dynamics steering angle engagement is present, is transmitted. The steering control device (8) conveys to the driving dynamics control device (38) the driver's choice $\delta_{CMD, DRV}$ (42) resulting from the driver's steering angle (11) and a steering choice transmission $v_{\delta ESAS}$ (52, see FIG. 3) , the pinion gear angle $\delta_R$ (15) marked and measured as the total steering angle, as well as information concerning the dynamic reserve DR (DR_pos or DR_neg, respectively) (43) that is available for ESP steering interventions.

The vehicle speed (45, 46) is likewise conveyed to the driving dynamics control device (38) as well as to the steering control device (8), the driving dynamics values (47) are conveyed to the driving dynamics control device, just as the rotational speed of the internal combustion engine $N_{Engine}$ (44) and a motor torque $M_{Mot}$ (48) of the superimposition motor (5) are conveyed to the steering control device as input values.

In the case of a steering unit of the "open center" type, in which no additional steering torque is transmitted in the straight-ahead position of the wheels (7), it is decided by means of the rotational speed of the internal combustion engine $N_{Engine}$ (44) whether the steering support is available through the power-assisted steering unit. If this is not the case, then the superimposition steering unit remains or becomes deactivated, and only the direct intervention of the driver on the steering gear (transmission factor v1) is effective.

The ESAS steering control device (8) determines corresponding triggering signals (66) for the superimposition motor (5) from the input values.

A schematic block diagram of the control concept for the engagement of a driving dynamics control device is depicted in FIG. 3.

Driving dynamics steering interventions of the driving dynamics control device (38) are considered to be a supplemental steering angle $\Delta\delta_{ESP}$ (39), which intervenes in the system in a correcting manner. An amplification factor $v_{\delta, ESAS}$ (52), from which the driver's choice $\delta_{CMD, DRV}$ (42) results, is thereby determined in accordance with the driver's steering angle (11) and a steering choice transmission $i_{ESAS}$. This is superimposed by the supplemental steering angle $\Delta\delta_{ESP}$ (39) resulting from the driving dynamics control unit (38). The theoretical value for the steering angle $\delta_{R, CMD}$ (49) that thereby results is conveyed to the control circuit (50) for the superimposition steering. The resulting steering angle $\delta_R = \delta_{Total}$ (15) is thereby adjusted, whereby the resulting steering angle (15) is conveyed back into the control circuit (50) as an input quantity.

The driving behavior and the vehicle dynamics can be positively influenced by means of the superimposition in a manner corresponding to a recognized driving situation, whereby the driving stability, on the one hand, as well as the maneuverability of the vehicle, on the other, can be increased. In particular, driving dynamics steering interventions are carried out in order to support the driver in his steering activity.

FIG. 4 depicts the control concept of the steering angle control system in a general overview. It is thereby essential for the determination of the driver's choice that a value for the gear input angle $\hat{\delta}_T$ (53) of the superimposition steering and steering angle control is first of all determined on the basis of the resulting steering angle $\delta_R = \delta_{Total}$ (15) (pinion gear) and of the motor angle $\phi_{Mot}$ (35) (see also FIG. 7).

The value of the gear input angle $\hat{\delta}_T$ (53) is thereby determined in accordance with the gear equation determined in a constructive manner for the superimposition steering system (54) (compare FIG. 7).

Through this, the driver's choice can be determined as a partial theoretical value of the steering angle control with a significantly higher resolution, which has a highly positive effect on the steering sensation.

The steering angle $\hat{\delta}_T$ (53) of the input side of the superimposition gear computed in the form described is multiplied (55) by the amplification factor $v_{\delta, ESAS}$ (52) resulting from the variable steering transmission (65). The driver's choice $\delta_{CMD, DRV}$ (42) for the steering angle control is present as the result.

It is consequently possible to operate the superimposition steering system with the steering wheel angle sensor (9) (of an ESP system) that is generally applied in serial form.

The value of the supplemental steering angle $\Delta\delta_{ESP}$ (39) resulting from the driving dynamics control device (38) is converted, by means of an interpolation and a limitation of increase (59), into a resulting, corrected supplemental steering angle $\Delta\delta_{ESP, IPO}$ (60).

The value of the limitation of increase can be selected in accordance with technical control viewpoints and can be changed, if necessary, in a manner corresponding to the available actuator speeds.

The resulting theoretical value $\delta_{R, CMD}$ (49) for the steering angle control results from the addition of the supplemental steering angle $\Delta\delta_{ESP, IPO}$ (60) and the steering angle $\delta_{CMD, DRV}$ (42) representing the driver's choice.

Furthermore, a theoretical value $\omega_{CMD, Anticip}$ (62) is determined for a rotational speed anticipatory control of the motor (5) of the steering unit (61) on the basis of the corrected supplemental steering angle $\Delta\delta_{ESP, IPO}$ (60), and is likewise conveyed (62) to the steering angle control device (63), which sets a resulting motor torque $M_{Mot, Cmd}$ (64).

The dynamic reserve is also computed (67) on the basis of the motor torque $M_{Mot}$ (48), the resulting amplification factor $v_{\delta, ESAS}$ (52), and the rotational angle $\delta_H$ (11) of the steering column (3). A positive signal DR_pos (68) or a negative signal DR_neg (69) is produced.

FIG. 5 depicts the determination of the resulting amplification factor $v_{\delta, ESAS}$ (52) as a component for the computation of the theoretical steering angle value. A resulting steering transmission $i_{\delta, ESAS}$ (52) is produced on the basis of the amplification factors K1 (70) and K2 (71), which are determined on the basis of the rotational angle $\delta_H$ (11) and the vehicle speed $V_{vehicle}$ 46). The amplification factors K1 (70) and K2 (71) are combined with the serial steering transmission $i_{L, Series}$ by means of multiplication.

The following is applicable:

$i_{\delta, ESAS} = \delta_V/\delta_H = i_{L, Series}/(K1*K2)$

The amplification factors K1 (portion dependent on steering wheel angle) and K2 (portion dependent on vehicle speed) can be freely selected in accordance with driving dynamics viewpoints, or in accordance with driver defaults, as the case may be.

FIG. 6 depicts the components of the steering control device considered here (63). The control of the motor torque $M_{mot}$ or of the torque-forming motor current $I_q$, as the case may be, as well as the commutation of the motor (5) (in the case of an electronic commutation), is assigned to the motor (5).

The control quantity of the steering control device (63) is thereby the resulting superimposed steering angle (pinion gear angle) $\delta_R$ (15), which is measured directly. The motor rotational speed $\omega_{Mot}$ (73), which can be computed from the motor angle $\phi_{Mot}$ (35) measured by means of differentiation (74), is used as an internal controlled quantity.

The steering angle control device depicted in FIG. 6 is, in terms of its basic structure, a cascade control device. In order to increase the control circuit dynamics, the theoretical value $\omega_{CMD, Anticip}$ (62) is, for the control of the rotational speed of the motor (5), subjected to anticipatory control. In order for the steering comfort to not be impaired by the anticipatory control, particularly during slow steering movements, a weighting of the anticipatory control value is carried out in dependence on the motor speed desired. It is hereby advantageous if the computation of the anticipatory control values $\omega_{CMD, Anticip}$ (62) depicted in FIG. 4 is carried out separately in accordance with the signal portions that emerge on the basis of the driver intervention (speed anticipatory control value—driver steering angle [60]), and on the basis of the ESP correction angle requested (speed anticipatory control value—ESP correction angle [49]). Depending on the requirements in regard to dynamics and comfort, both of these portions can then be weighted separately from one another.

The value determined by the steering angle control device (63) is, upon consideration (75) of the motor rotational speed $\omega_{Mot}$ (73) and of the anticipatory control value $\omega_{CMD, Anticip}$ (62), conveyed to a rotational speed control device (76) in order to produce the signal of the resulting motor torque $M_{Mot, Cmd}$ (64).

In FIG. 7, the determination of the gear input signal $\hat{\delta}_T$ (53) is indicated as the basis for the determination of the driver's choice $\delta_{CMD, DRV}$ (42) for the steering angle control. In accordance with the invention, in the event that no ESP steering angle intervention is present in accordance with the resulting steering angle $\delta_R = \delta_{Total}$ (15) (pinion gear angle) and the motor angle $\phi_{Mot}$ (35), this value is determined on the basis of the transmission factors $v_1$ and $v_2$ preset in a constructive manner.

In certain cases of operation, a higher motor rotational speed than is available may be necessary. In this case, a requirement-dependent short-term increase of the rotational speed of the motor can be achieved without a reduction of the motor torque available through the use of a weakening of the field of the motor (5). A short-term increase of the total current absorption is connected with the same, however.

The presence of a very direct steering transmission, in particular, as well as a high theoretical speed on the part of the driver or the driving dynamics control system, is to be considered to be a case of need.

A decision is made about the application of the field weakening and the level of the weak field current by means of the present actual condition of the steering unit—that is to say, an attached actual motor speed and an attached steering angle value,—as well as of the desired theoretical condition—that is to say, a motor rotational speed default and a theoretical steering angle value,—and by means of the amplification factors of the steering transmission.

If no field weakening of the motor (5) is necessary, then the resulting weak field current $I_{d, \ Theoretical}$ is zero ($I_{d, \ Theoretical} = 0$ A).

In addition to the torque-forming current $I_q$, the torque control of the electronically commutated motor must then be additionally adjusted to the field-weakening current value $I_d$.

The invention claimed is:

1. A method for steering a motor vehicle with a superimposition steering system, comprising:
    detecting a driver's steering angle and a supplemental steering angle; and
    superimposing the driver's steering angle with the supplemental steering angle, with a superimposition gear, in accordance with additional values by means of a superimposition actuator,
    wherein a value for a gear input angle of the superimposition gear is determined in accordance with a resulting steering angle of the steering system and in accordance with a value that is directly dependent on the supplemental steering angle or describes the supplemental steering angle,
    wherein the superimposition actuator is an electrical motor, and the electrical motor is triggered by a weak field current if at least one of a direct steering transmission or a high predetermined steering speed is desired or necessary, and
    wherein an anticipatory control of a predetermined speed of the electrical motor is carried out, which is determined from a motor rotational speed default and a motor rotational speed predetermined default, whereby the predetermined motor rotational speed default is determined on the basis of a comparison of a predetermined steering angle value with an actual steering angle value that has been determined, and the motor rotational speed default is determined from a temporal differentiation of the theoretical steering angle value in accordance with signal portions that result from the steering choice of the driver and on the basis of an ESP correction angle requested.

2. A method according to claim 1, wherein a driver's desire of a steering movement is formed by multiplying the value for the gear input angle by an amplification factor resulting from a variable steering transmission.

3. A method according to claim 1, wherein a resulting steering angle of the steering system is formed, which is a pinion gear angle of a toothed rack steering unit.

4. A method according to claim 1, wherein the location or position of a superimposition actuator electronic superimposition motor is based on the supplemental steering angle.

5. A method according to claim 1 further comprising:
    a steering angle regulation system with current- or motor torque regulation of an electrical motor as a superimposition actuator, whereby a predetermined current or a predetermined motor torque is produced in dependence on a comparison between an actual steering angle value and a predetermined steering angle value, by means of which the electrical motor feeds the supplemental steering angle into the steering system.

6. A method according to claim 1, wherein the driver's steering angle is augmented in accordance with a fixed or variably set gear transmission factor, and the drive transmission factor is selected in a manner corresponding to one of the detected forward speed of the vehicle and a steering wheel locking angle, and a superimposed steering angle is determined and conveyed to the steering control system as an actual value.

7. A method according to claim 1, wherein the driver's steering angle is, in connection with a superimposition factor by means of which the driver's steering angle acts directly on a steering gear, superimposed in an additive manner with a supplemental steering angle in connection with a second transmission, and that, a superimposed steering angle is determined and is conveyed to the steering control system as an actual value.

8. A method according to claim 1, wherein a driving dynamics regulating system (ESP system) cooperates with the steering control system, and that, if the need for a stabilizing engagement is detected by the driving dynamics control system, an additional steering angle dependent on the driving dynamics is determined and is superimposed on the driver's steering angle in an additive manner.

9. A method according to claim 1, wherein an anticipatory control of the predetermined speed of the electrical motor is carried out, and that the anticipatory control value is weighted in dependence on a desired motor speed of the electrical motor.

10. A method according to claim 1, wherein an anticipatory control of a predetermined speed of the electrical motor is carried out and the signal portions that result from the driver's steering angle and from the ESP correction angle requested are weighted separately from one another in regard to dynamics and comfort.

* * * * *